Patented Apr. 13, 1943

2,316,719

UNITED STATES PATENT OFFICE 2,316,719

PURIFICATION OF ORGANIC SUBSTANCES

Kenneth Lyman Russell, Nutley, N. J., assignor to Colgate-Palmolive-Peet Company, Jersey City, N. J., a corporation of Delaware No Drawing. Application August 23, 1941, Serial No. 408,108

14 Claims. (Cl. 260—400)

The present invention relates to a method for separating substances having appreciable differences in solubility in various solvents and, more particularly, to a method for purifying organic compounds, especially organic sulphate and sulphonate salts, by removing inorganic salts therefrom.

In preparing various organic compounds, especially where neutralization is a step in the process, inorganic salts are frequently produced and occur as impurities in the final product. Synthetic detergents, especially sulphated and sulphonated organic compounds which are produced by the neutralization of the product of the reaction of sulphonating agents upon various organic materials, are particularly notable in this respect. After sulphonation of such organic materials, the reaction product is usually neutralized with an alkaline material. The result of this neutralization is to form organic sulphate and/or sulphonate salts and concomitantly to form salts of the sulphonating agent. Thus, the addition of sodium hydroxide to neutralize an organic sulphonic acid also has the effect of producing sodium sulphate by reaction with the excess sulphonating agent. If an organic base is employed for the neutralization, the resulting mixture includes the sulphate or sulphonate of the organic cation.

The presence of inorganic sulphates in sulphated and sulphonated products affects the detergency properties of these materials. Since inorganic salts seldom have marked detergent or like properties, the detergency strength of the detergent with which they are admixed is necessarily reduced. Moreover, in many uses of detergents or cleansing or emulsifying compounds, the presence of inorganic salts may be undesirable. This may be particularly so where the detergent compounds are to be employed in chemical reactions, in the manufacture of dyes, or in other uses where a high degree of purity is essential. Thus, for many uses, it is very advantageous to have substantially pure compounds.

Many methods have been suggested for removing inorganic salts from organic sulphate and sulphonate salts, but these suggested methods have many drawbacks which considerably lessen their desirability for adaptation to commercial and industrial operation. Among the difficulties inherent in the methods of the prior art are the requirements for large amounts of organic solvents for extraction, numerous items of equipment for filtration which are expensive to maintain, generous floor space to accommodate such equipment, increased plant maintenance, additional labor and supervision, etc. Therefore, although many suggestions and proposals have formerly been made for solving this problem, none of these has provided a satisfactory solution on a practical scale.

It has been discovered that a satisfactory solution to this problem, which removes practically all of the handicaps of earlier methods, can be easily and simply accomplished.

It is an object of the present invention to provide a novel method for purifying an organic sulphonate salt by removing inorganic salts therefrom.

It is another object of this invention to provide an improved process for dissolving organic sulphate and sulphonate salts in organic solvents wherein inorganic salts present therewith are relatively insoluble and thereafter removing from such organic solvent other solvent for the inorganic salt.

Other objects and advantages of the present invention will be apparent to those skilled in the art from the following description.

According to the present invention, a mixture of salts dissolved in a common solvent is separated by adding a quantity of a solvent which selectively dissolves certain salts of the mixture. The liquid body is thoroughly mixed, and, after standing, layers of liquid solutions are thereby formed: one layer containing a small portion of the common solvent, substantially all of the selective solvent and substantially all of the salts which are selectively dissolved by the latter; and another layer containing substantially all of the common solvent, a small portion of the selective solvent and substantially all of the salts not selectively dissolved by the latter. The layers are separated, and the first layer is treated for removing the minor portion of common solvent present therein. Such treatment causes the separation of any salts present in this layer which are not dissolved by the selective solvent. These separated salts are removed from contact with the selective solvent, and the selective solvent is then removed to produce a yield of salt selectively dissolved by such solvent, separated from salts undissolved therein.

As applied to a mixture of organic sulphate or sulphonate salts with inorganic salts dissolved in water, such solution is preferably brought to a desired concentration, as will appear infra, and a preferred amount of an organic solvent, also more clearly defined hereinafter, is added. The liquid body is thoroughly mixed and, upon standing, separates into two layers. One layer contains a major portion or substantially all of the organic solvent, a major portion or substantially all of the organic sulphate or sulphonate salt, a small part of the water, and a minor proportion of inorganic salt dissolved in the water. The other layer contains a small part of the organic solvent, a small part of the organic sulphonate or sulphate salt, a major part of the water, and a major proportion of the inorganic salt. The two layers are separated, as by decantation or by withdrawal of the heavier layer in a separatory device or by other suitable means, and the organic solvent layer is then dehydrated to eliminate the water and to precipitate the inorganic salt remaining dissolved therein. The precipitated inorganic salt is separated from the organic solvent by decantation, filtration and/or centifuging or by other means. The organic solvent, which now has in solution the organic sulphate or sulphonate salts substantially devoid of inorganic salts, is then removed, preferably by vaporization.

When a water-miscible organic solvent is employed, since the salts are generally all water-soluble, a two phase system, i. e., two liquid layers, would not be foreseen. On the other hand, when a water-immiscible organic solvent is used, it would be surmised that only a minute quantity of water would be found in the organic solvent layer containing substantially all of the organic compound. In either case, contrary to expectations, a considerable amount of water is generally contained in the organic solvent layer in which the major portion of organic sulphate or sulphonate salts is dissolved. Moreover, there is no apparent tendency in this organic solvent layer, after separation from the water layer, for the water-immiscible organic solvent to separate from water remaining dissolved therein.

Among the organic solvents which were found to be suitable for use in the present invention, as applied to the purification of organic sulphate and sulphonate salts, are those in which such organic salts preferentially dissolve in the presence of water laden with inorganic salts, whether said organic solvents are classed as miscible, partly miscible or immiscible with water. These solvents include dioxane; Cellosolve (ethylene glycol monoethyl ether); Carbitol (diethylene glycol monoethyl ether); aliphatic alcohols having at least two carbon atoms per molecule, and preferably those having from two to about six carbon atoms, such as ethanol, isopropanol, n-butanol, n-hexanol, etc.; monoglycerides, as of coconut oil fatty acids; monofatty acid esters of glycols, such as ethylene glycol monoesters of coconut oil fatty acids; water-soluble aliphatic ketones, such as acetone, methyl ethyl ketone, diethyl ketone and substituted derivatives thereof; isobutyric acid; and Cellosolve acetate (ethylene glycol monoethyl ether acetate). These solvents may be used singly or in any desired mixture either with each other or with other solvents, including water-immiscible solvents like benzol, toluol, the xylols, chlorinated solvents such as carbon tetrachloride and chloroform, ethers, petroleum solvents, etc.

The efficiency of the separation process of the present invention is considerably affected by the concentrations of the various compounds and solvents employed, as well as by the temperatures at which the process is carried out. It will be appreciated by those skilled in the art in the light of present disclosures that optimum temperatures for most advantageous operation vary with the different solutes and solvents used. For example, considering alone the purification of organic sulphate or sulphonate salts by removal of inorganic salts therefrom, when a solution containing about 35% solids (in the ratio of about 65 to 35 by weight of sodium sulphate to the sodium salt of the sulphuric acid esters of coconut oil fatty acid monoglycerides) is treated, temperatures within a range of about 25° to about 70° C. are suitable. A preferred range for carrying out the present process with this mixture is of the order of about 30° to about 45° C. These temperatures may vary with the particular solvent used, as well as with the specific solutes dissolved in the mixed solvents. Moreover, the concentration of the inorganic salt has a bearing in this respect; for example, since the maximum solubility of sodium sulphate in water is attained at about 32.5° C., it follows that, if a saturated solution of sodium sulphate is prepared at 32.5° C. and the temperature is thereafter allowed to change, some precipitation will result.

The following table has been prepared for comparative purposes to show the approximate minimum amount of each of five organic solvents which will cause a separation in the case of each of a number of aqueous solutions. In each case, the mixed solute consisted of about 65% sodium sulphate and about 35% sodium salt of the sulphuric acid esters of coconut oil fatty acid monoglycerides. The concentrations of this mixture in water solution are shown in the first column of the table, and the values appearing opposite these concentrations in the respective columns represent the minimum percentage by weight of organic solvent (based on the total weight of solids) which will cause a separation at a temperature of about 38° C.

Table I

| Concentration of organic and inorganic salts | Isopropanol (98%) | N-Butanol | Dioxane | Acetone | Cellosolve |
| --- | --- | --- | --- | --- | --- |
| 40 | 8.5 | 13 | 7.8 | 15 | 9.3 |
| 35 | 15 | 15 | 19.5 | 20 | 21 |
| 30 | 20 | 18 | 34 | 42 | 38 |
| 25 | 25 | 20 | 63 | 70 | 65 |
| 20 | 76 | 26 | 122 | 114 | 128 |
| 15 | 164 | 36 | 252 | 208 | 280 |

In determining the minimum quantity of organic solvent necessary for a separation, it will be seen from the table that an amount of dioxane equivalent to about 7.8% by weight of the solids content of the aqueous solution is required to cause a separation into two phases of a 40% solution of the mixed salts used. That is, to cause a separation at this temperature, a little more than 3 grams of dioxane must be added to about 100 grams of an aqueous solution containing about 40 grams of solids, said solids being in the ratio of about 65 parts of sodium sulphate to 35 parts of the sodium salt of the sulphuric acid esters of coconut oil fatty acid monoglycerides. In practicing this process, it is preferred to use somewhat more of the solvent than the minimum required for separation.

It has been found that concentrations substantially above 40% solids of this particular mixture, as shown in the foregoing table, are susceptible to treatment only with difficulty at this temperature. The maximum concentration is primarily governed by the maximum amount of solids that will dissolve in a given quantity of water, and the amount of organic solvent required to effect separation appears roughly to vary inversely with the concentration of the solids. After the separation has been effected, the upper supernatant layer is decanted from the lower, or the lower layer is withdrawn from the upper in a separatory vessel, or other suitable means for isolating the layers from each other can be employed.

The organic solvent layer containing substantially all of the organic sulphate or sulphonate salt and a minor portion of water with a small proportion of inorganic salt dissolved therein is then subjected to a dehydrating treatment. The dehydrating step may be accomplished in any suitable manner, such as distillation with or without the addition of adjuvant liquids, depending upon the physical properties of the organic solvent employed, the use of dehydrating agents like clay, anhydrous calcium sulphate (preferably specially treated), anhydrous magnesium sulphate, anhydrous sodium sulphate, and other suitable anhydrous salts, etc., and/or other means. When the organic solvent layer is dehydrated, inorganic salt that was dissolved in the water thus removed is precipitated, and in this manner substantially all inorganic salts can be removed from solution in the organic solvent.

The precipitated inorganic salt, as well as the dehydrating agent if one has been employed, is then removed from the organic solvent by filtering, centrifuging and/or decanting. The organic solvent can be removed, preferably by vaporization, to leave the solid organic sulphate or sulphonate salt substantially devoid of inorganic impurities. The vaporized solvent can be condensed and recovered, if desired.

When organic solvents are added to an aqueous solution of organic sulphate or sulphonate salts and inorganic salts, it may or may not be necessary to employ adjuvant liquids during the dehydration distillation of the organic solvent layer. If the solvent employed has a boiling point sufficiently above that of water, it is usually unnecessary to add another liquid to the organic solvent layer, as there is little difficulty in boiling off the water. However, where the organic solvent selected is below or near the boiling point of water, it may be found desirable to add such liquid as will form an azeotropic mixture with the water, and the distillation can then be carried out to dehydrate the organic solvent layer.

In selecting such adjuvant liquid, it is advantageous to use a water-immiscible liquid having a specific gravity appreciably different from that of water, such as benzene, toluene, ether, carbon tetrachloride, or the like. This liquid and the small amount of water dissolved in the organic solvent layer form an azeotropic mixture and boil off together, and the condensed vapor can be separated in a trap or by other means. In this manner, the water, having a specific gravity different from that of the volatilized solvent, can be removed therefrom, while the water-immiscible solvent liquid is permitted to flow back from the trap into the boiling mixture. The reflux distillation is continued until no more water separates, at which time the organic solvent layer is substantially free of water, and the inorganic salt is precipitated. After removal of the inorganic salt, the organic solvent and adjuvant liquid are vaporized to produce the purified organic sulphate or sulphonate salt. In economical operation, it is of advantage to recover the vaporized solvent and adjuvant liquid.

When carrying out the dehydration by partial distillation of certain solvents, such as isopropyl alcohol, in the absence of adjuvant liquids, there is sometimes so much vaporization of the solvent along with the water that insufficient solvent remains for dissolving the organic sulphate and sulphonate salts. Under such circumstances, a better yield is obtainable by adding more solvent to the solvent layer after isolating it from the water layer. Such additional solvent can be added either before or during distillation and may be introduced either in a single increment, continuously, or intermittently.

Another method of dehydrating the organic solvent layer after its isolation from the water layer has been set forth herein as comprising a treatment of such organic solvent layer with a dehydrating agent. Among the agents which have been mentioned as suitable for this purpose are various anhydrous inorganic salts. The solubility of inorganic salts in water is markedly reduced in the presence of organic solvents, so that the moisture in the organic solvent layer is usually already saturated with the organic salts present. According to the present invention, even if this water is still unsaturated, the addition to the organic solvent layer of anhydrous salts of the deliquescent type quickly saturates the amount of water therein, and additional amounts of such salts take up moisture from the liquid body and fall to the bottom of the vessel. The deliquescent nature of these anhydrous salts is thus employed to remove the water present, and, as this water is taken out, the inorganic salts which were dissolved therein are precipitated.

It is notable in this connection that, where sodium sulphate is present, as it will normally be when a sulphated or sulphonated organic compound is neutralized with sodium hydroxide, such sodium sulphate can be removed from the organic solvent layer by adding relatively small additional amounts of sodium sulphate. Such additions are of anhydrous sodium sulphate, and this absorbs the water contained in the layer and soon appears at the bottom of the vessel. The anhydrous salt has the capacity of taking up 10 mols of water per mol of sodium sulphate to form the decahydrate and, in contact with the organic layer, proceeds to remove water therefrom. As the water is removed, the sodium sulphate, together with other inorganic impurities, is precipitated from the layer. Dehydration with sodium sulphate must be accomplished in relatively cold solution, as above 32.5° C. the hydrated salt gives up its water of crystallization and becomes anhydrous. In similar manner, other anhydrous dehydrating agents employed should be used below the respective temperatures at which they lose water of hydration.

The following examples, described herein so that those skilled in the art may have a better understanding of the present invention, are merely illustrative thereof, and it will be understood that the invention is not limited thereon.

*Example I*

A mixture containing about 42 grams of the sodium salts of the sulphuric acid esters of coconut oil fatty acid monoglycerides and about 78 grams of sodium sulphate is dissolved in about 180 grams of water at a temperature of about 38° C. About 36 cc. (approximately 28.5 grams) of acetone is added, and, upon thorough mixing, two liquid layers are formed. The supernatant layer, having a volume of about one-half of the lower layer, can be removed and will be found to contain about 6% of the original amount of sodium sulphate in the mixture together with more than 90% of the organic sulphate. The lower aqueous layer contains a small amount, of the order of about 8 to about 9%, of acetone, the ratio of acetone to water in the upper layer being roughly about 1:2. During the separation a temperature of about 40° C. is maintained. The upper or acetone layer is decanted off and distilled to remove water therefrom, adding fresh anhydrous acetone throughout the distillation. Upon completion of the dehydration, there is a precipitate of sodium sulphate at the bottom of the vessel which amounts to almost all of the sodium sulphate in the layer. The sodium sulphate is removed by filtration, and the acetone is then distilled off to recover the organic sulphate.

Example II

An aqueous solution of sodium sulphate and the sodium salt of the sulphuric acid ester of coconut oil fatty acid monoglyceride, such as is described in Example I, is mixed with about 45 grams of dioxane. Two distinct liquid layers are formed, and the top layer contains more than 94% of the organic sulphate and less than 6% of the sodium sulphate. During the mixing and separation, the temperature is maintained at about 38° C. The lower layer is withdrawn from the upper layer in a separatory vessel, and to the upper layer is added about 200 cc. of benzol. This liquid body is then subjected to distillation, employing a reflux condenser and moisture trap, as described hereinbefore, and such distillation is continued until the dioxane layer is dehydrated. Thereafter sodium sulphate, which precipitates out upon such dehydration, is removed by decanting the liquid therefrom, and the dioxane and benzol are distilled off to leave the organic sulphate.

Example III

A mixture of about 17.5 grams of the ammonium salt of hexadecane sulphonate produced by reacting hexadecane with chlorine and sulphur dioxide in the presence of light together with about 32.5 grams of ammonium sulphate is dissolved in about 50 grams of water at about 40° C. About 12 grams of 95% ethyl alcohol is then added to the solution and is mixed therewith. After the liquid body has settled into two layers, the alcohol layer is removed and distilled in a water separation apparatus such as has been indicated. The boiling is continued until no more water is separated, at which time the ammonium sulphate is at the bottom of the distillation vessel. The alcohol solution of the organic sulphonate is transferred to centrifuge tubes and there whirled to settle suspended solids, after which it is decanted off. The alcohol is then evaporated to leave a residue of organic sulphonates substantially free of inorganic impurities.

Example IV

About 34 grams of the sodium salt of the reaction product of a mineral oil extract and sulphuric acid mixed with about 41 grams of sodium sulphate is dissolved in about 113 grams of water. About 28 grams of dioxane are added and mixed with this solution to form two liquid layers, the temperature being kept at about 38° C. The upper layer containing substantially all of the organic sulphonate and only about 3% of the sodium sulphate, is isolated from the lower layer and is dehydrated by shaking with clay. The sodium sulphate is precipitated by this treatment, and the clay and precipitated sodium sulphate are removed by decanting the dioxane layer therefrom. Thereafter, the dioxane is removed by distillation and recovered, leaving the purified sulphonated product as a residue.

Example V

A mixture of about 25.6 grams of the magnesium salts of the sulphuric acid esters of coconut oil fatty acid monoglycerides and about 54.4 grams of magnesium sulphate are dissolved in about 140 grams of water. About 24 grams (30 cc.) of acetone is stirred into the solution at about 42° C. The upper layer is removed and cooled, and anhydrous magnesium sulphate is added thereto. Upon agitating, the magnesium sulphate in excess of the amount required to saturate the moisture in the acetone layer removes such moisture and causes substantially all of the magnesium sulphate, including the amount originally present, to precipitate out. Magnesium sulphate is removed by centrifuging and decanting, and the acetone is then distilled off and recovered to leave a residue of the organic sulphate.

Example VI

A mixture of about 50 grams of sodium salts of sulphated fatty alcohols derived from coconut oil and about 50 grams of sodium sulphate is dissolved in about 120 grams of water. About 12 grams of acetone is added to this solution and thoroughly mixed therewith to form a liquid body of two layers. The upper or acetone layer is decanted off and dehydrated by distillation, adding about 50 cc. of benzol to form an azeotropic mixture with the water and employing a water trap, as in Example II. The sodium sulphate precipitates out and is removed, and the acetone is then boiled off to recover the organic sulphate.

Example VII

A solution of about 210 grams of the sodium salts of the sulphuric acid esters of coconut oil fatty acid monoglycerides and about 390 grams of sodium sulphate in about 1000 grams of water is intimately mixed with about 180 grams of isopropyl alcohol and is allowed to settle. The upper layer is removed and is treated with about 50 grams of anhydrous sodium sulphate. The resulting suspension is agitated and allowed to stand for about an hour. It is then centrifuged and decanted, and the clear liquid is passed over a roll-dryer. The organic sulphate sodium salts thus obtained are of about 98% purity.

Example VIII

An aqueous solution comprising about 45 parts of the potassium salts of a sulphonation product obtained by treating a gas oil fraction having an average molecular weight of about 235 with sulphuryl chloride in the presence of actinic light and pyridine as an activating agent and about 75 parts of potassium sulphate in about 180 grams of water is mixed with about 25 grams of Cellosolve at about 40° C. Upon standing, the mixture separates into two layers, and the Cellosolve layer is isolated from the aqueous layer, and shaken with silica gel. The water contained therein is thereby removed, and the potassium sulphate precipitates. It is removed by filtering, and the Cellosolve is then vaporized to produce the organic sulphonate salts.

*Example IX*

About 330 grams of an aqueous solution containing about 13% of solids comprising the sodium salt of the sulphuric acid ester of coconut oil fatty acid monoester of glycol, sodium sulphate and sodium chloride is successively extracted in a separatory funnel with 100 cc., 50 cc., and 50 cc. portions of n-butyl alcohol. Additional sodium sulphate is introduced to salt out the n-butyl alcohol layer. The water is then removed from this layer by distillation in vacuo at about 30° C., and, due to the dehydration, sodium sulphate comes out of solution and is deposited at the bottom of the vessel. The sodium sulphate is removed from the n-butyl alcohol layer by filtration. The distillation is then continued until the n-butyl alcohol extract suddenly shows a milky appearance. When this phenomenon occurs, the distillation is stopped. The extract is then evaporated upon a steam bath, heating being continued until crystallization in the hot solution begins. The extract is thereafter permitted to stand for some hours, as overnight, to cool, and the product is filtered from the butyl alcohol. It is dried in a stream of air for about 7 hours to produce about 19.5 grams of white, powdery sodium salt of the sulphuric acid ester of coconut oil fatty acid monoester of glycol.

While the preceding examples have been described with reference to a substantially complete removal of inorganic salts from organic sulphate or sulphonate salts and while the present invention may thus be employed to purify organic detergents by removing therefrom substantially all of the inorganic salts formed in their preparation, it will be understood that the proportion of inorganic salts may be reduced to any determined degree short of complete removal by proper regulation of the quantity of organic solvent used or by other control which one skilled in the art will recognize with an understanding of the process herein disclosed. Hence, by this invention, it is possible to prepare a detergent composition having a desired proportion of active ingredient. Furthermore, although the examples cited are illustrative of an improved method for producing dry organic sulphate and sulphonate salts, it will be understood that such salts can be obtained in solution and substantially free of inorganic salts by omitting the step of vaporizing or otherwise removing the substantially anhydrous and inorganic salt-free organic solvent. Moreover, the process of the present invention is adapted for application to a detergent solution containing inorganic salt dissolved therein, such as results from most commercial processes now being followed in preparing such detergents from raw materials. When utilizing the present process at this point, a material saving is effected over the usual methods which necessitate evaporation, extraction, etc.

The process of the present invention is applicable to the purification of organic sulphate and sulphonate salts produced by the sulphation and sulphonation of various organic materials, including fatty oils, mineral oils, mono- and diglycerides, partial esters of polyglycerols, esters of glycols and polyglycols, aromatic and alkylated aromatic compounds, long chain alcohols and olefines, coal tar distillates, and numerous other organic compounds and mixtures of compounds.

These organic compounds, the sulphates or sulphonates of which may be neutralized as aforesaid with an alkaline material, can be sulphonated by any of several methods and may form any of several products, depending upon the method of sulphation or sulphonation employed. The sulphated or sulphonated organic compounds include sulphonated mineral oil; conventional mineral oil refinery sludges; sulphonated mineral oil extracts, such as the products described in U. S. Patents Nos. 2,149,661; 2,149,662 and 2,179,174; sulphonated fatty acids and oils, such as sulphonated castor oil, sulpho-ricinoleic acid, sulphonated olive oil, and sulpho-oleic acid; long chain aliphatic sulphonates and sulphates, such as cetyl sulphuric acid, lauryl acid sulphate, and tetradecanehydroxy sulphonic acid-1,2; aliphatic ether and ester sulphonates, such as the dodecyl ether of hydroxy ethyl sulphonic acid, the cetyl ether of glyceryl sulphonic acid, tallow monoglyceride monosulphate, and coconut oil fatty acid monoesters of beta methyl glycerine sulphonic acid, sulphonates prepared by treatment of organic materials with sulphur dioxide and chlorine and hydrolysis of the product; sulphonates prepared by treatment of organic bodies with sulphuryl chloride and an activating agent and hydrolysis of the product; fatty acid amides of amino alkyl sulphonic acids, such as lauric amide of taurine and tall oil acid amide of amino glyceryl sulphonate; sulphonic acids of naphthenes and naphthenic acids; lignin sulphonic acids; aromatic and alkylated aromatic sulphonic acids, such as naphthalene sulphonic acid, lauryl benzene sulphonic acid, and stearyl naphthalene sulphonic acid; the product of a mineral oil extract sulphonated while dissolved in liquid sulphur dioxide; and innumerable other organic sulphonic and sulphuric acid derivatives or mixtures thereof. These organic sulphate and sulphonate salts may include water-soluble detergents, whether the organic radicals of the molecule are "pure" or contain substituents as halogens, halogenoids, hydroxyls, nitrogen-containing groups, acyloxy groups, alkoxy groups, ketonic groups, etc.

In all cases, optimum results may be obtained by utilizing the most efficient proportion of organic solvent. Hence, if a certain proportion of solution fails to give the desired purification, a change in the proportion of organic solvent may be found to produce better results. Furthermore, in some cases, especially where the proportion of inorganic salt is small, an increase in the proportion of inorganic salt to organic detergent compound can be used to effect a greater final degree of purification. For this reason, it may be desirable to add to the mixture of organic compounds and inorganic salt, or to the solution thereof, an additional amount of inorganic salt, either of the same kind already in the mixed solution or of a different kind.

It will be understood that such addition is not at all for the same purpose as the addition of inorganic salt described supra as a means of dehydrating the organic solvent layer. In this case, no such effect can be had, since the water and organic solvent layers are not yet isolated from each other at this point, and the advantage sought from such addition is to salt out the organic solvent from the aqueous solution, thus obtaining optimum separation of the two layers.

Although the present invention has been described in connection with illustrative examples thereof, it will be understood by those skilled in the art that other variations and modifications of the invention can be made and that various equivalents can be substituted therefor without departing from the principles disclosed herein. Thus, while the examples have been directed to the separation of inorganic sulphates from organic sulphate and sulphonate salts, it will be appreciated that this invention has similar applicability in separating two or more substances by the use of liquids having a selective solvent action with respect to the materials to be separated. For example, this invention is applicable to the separation of a single inorganic salt from a single organic compound or from a mixture of organic compounds, or to the separation of a mixture of inorganic salts from a single organic compound or from a mixture of organic compounds. Similarly, while the common solvent for the organic and inorganic salts has been specified as water throughout the examples, it will be appreciated that the method described has applicability where solutions other than aqueous are employed. A mixture of two or more organic solvents may be employed for selectively dissolving the organic salt instead of a single solvent, as set forth in most of the examples.

The separation of solvent liquids from purified organic compounds after precipitation and removal of inorganic salts has been described as being effected by vaporization. Such vaporization may be accomplished by evaporation under pressure, at atmospheric pressure or at reduced pressure, and/or by partial evaporation and centrifuging and/or by freezing and centrifuging at reduced temperatures and/or by other suitable methods. These and other variations and modifications of this invention are believed to be within the scope of the present specification and within the purview of the present claims.

I claim:

1. The process of separating organic sulphate and sulphonate salts from inorganic salts which comprises mixing an aqueous solution of organic salts selected from the group consisting of organic sulphate and sulphonate salts and inorganic salts with an organic solvent wherein the organic salts are soluble to cause the formation of liquid layers including a layer containing a major portion of the organic solvent, isolating said layer, dehydrating said layer to precipitate inorganic salts dissolved therein, and removing said precipitated inorganic salts from contact with the organic solvent.

2. The process of separating organic sulphate and sulphonate salts from inorganic salts which comprises mixing an aqueous solution of organic salts selected form the group consisting of organic sulphate and sulphonate salts and water-soluble inorganic salts with an amount of an organic solvent wherein the organic salts are soluble sufficient to cause the formation of liquid layers, isolating the predominantly organic solvent layer, dehydrating said layer to precipitate the water soluble inorganic salts dissolved therein, and removing said precipitated inorganic salts from contact with the organic solvent.

3. The process of purifying organic sulphate and sulphonate salts which comprises mixing an aqueous solution of organic salts selected from the group consisting of organic sulphate and sulphonate salts and water-soluble inorganic sulphates with a sufficient amount of an organic solvent wherein the organic salts are soluble to cause the formation of liquid layers, isolating the layer containing a major portion of the organic solvent, dehydrating said layer to precipitate the inorganic sulphates dissolved therein, removing said precipitated inorganic sulphates from contact with the organic solvent, and recovering the organic salts from the organic solvent.

4. The process of separating organic sulphate and sulphonate salts from inorganic salts which comprises mixing an aqueous solution of organic salts selected from the group consisting of organic sulphate and sulphonate salts and inorganic salts with a sufficient amount of an organic solvent wherein the organic salts are soluble to cause the formation of liquid layers including a layer containing a major portion of the organic solvent, isolating said layer, treating said layer with a dehydrating agent to remove water from said layer and to precipitate inorganic salts dissolved therein, and removing said precipitated inorganic salts from contact with the organic solvent.

5. The process of purifying organic sulphate and sulphonate salts which comprises mixing an organic solvent wherein organic sulphate and sulphonate salts are soluble with an aqueous solution of organic salts selected from the group consisting of organic sulphate or sulphonate salts and inorganic sulphates to cause the formation of liquid layers, isolating the predominantly organic solvent layer, treating said layer with substantially anhydrous sodium sulphate to dehydrate the layer and to precipitate inorganic sulphates dissolved therein, removing said precipitated inorganic sulphates from contact with the organic solvent, and recovering the organic salts substantially free of inorganic sulphates from the organic solvent.

6. The process of separating organic sulphate and sulphonate salts from inorganic salts which comprises mixing an aqueous solution of organic salts selected from the group consisting of organic sulphate and sulphonate salts and inorganic salts with a sufficient amount of an organic solvent wherein the organic salts are soluble to cause the formation of liquid layers including a layer containing a major portion of the organic solvent, isolating said layer, partially distilling said layer to vaporize water therefrom and to precipitate inorganic salts dissolved therein, and removing said precipitated inorganic salts from contact with the organic solvent.

7. The process of purifying organic sulphate and sulphonate salts which comprises mixing an organic solvent wherein organic sulphate and sulphonate salts are soluble with an aqueous solution of organic salts selected from the group consisting of organic sulphate and sulphonate salts and inorganic sulphates to cause the formation of liquid layers, isolating the predominantly organic solvent layer, partially distilling said layer to remove water therefrom and to precipitate inorganic sulphates dissolved therein, adding compensating amounts of the organic solvent to the predominantly organic solvent layer before completion of the partial distillation, removing the precipitated inorganic sulphates from contact with the organic solvent, and recovering the organic salts substantially free of inorganic sulphates from the organic solvent.

8. The process of purifying organic sulphate and sulphonate salts which comprises mixing an organic solvent wherein organic sulphate and sulphonate salts are soluble with an aqueous solution of organic salts selected from the group consisting of organic sulphate and sulphonate salts and inorganic sulphates to cause the formation of liquid layers, isolating the predominantly organic solvent layer, adding an organic liquid capable of forming an azeotropic mixture with water to said predominantly organic solvent layer to form a liquid mass, partially distilling said liquid mass to vaporize water therefrom and to precipitate inorganic sulphates dissolved therein, removing said precipitated inorganic sulphates from contact with the liquid mass, and recovering the organic salts substantially free of inorganic sulphates from the organic solvent.

9. The process of separating organic sulphate and sulphonate salts from inorganic sulphates which comprises mixing an aqueous solution of organic salts selected from the group consisting of organic sulphate and sulphonate salts and inorganic sulphates with an amount of an aliphatic alcohol having at least two carbon atoms sufficient to cause the formation of liquid layers, isolating the layer containing a major portion of the alcohol, dehydrating said layer to precipitate inorganic sulphates dissolved therein, and removing said precipitated inorganic sulphates from contact with the alcohol.

10. The process of purifying organic sulphate and sulphonate salts which comprises mixing an aqueous solution of organic salts selected from the group consisting of organic sulphate and sulphonate salts and inorganic sulphates with a sufficient amount of isopropanol to cause the formation of liquid layers, isolating the layer containing a major portion of the isopropanol, dehydrating said layer to precipitate inorganic sulphates dissolved therein, removing said precipitated inorganic sulphates from contact with the isopropanol, and recovering the organic salts substantially free of inorganic sulphates from the isopropanol.

11. The process of purifying salts of the sulphuric acid esters of coconut oil fatty acid monoglycerides which comprises mixing an aqueous solution of salts of the sulphuric acid esters of coconut oil fatty acid monoglycerides and inorganic sulphates with a sufficient amount of isopropanol to cause the formation of liquid layers, isolating the predominantly isopropanol layer, partially distilling said layer to vaporize water therefrom and to precipitate inorganic sulphates dissolved therein, removing said precipitated inorganic sulphates from contact with the isopropanol, and recovering from the isopropanol salts of the sulphuric acid esters of coconut oil fatty acid monoglycerides substantially free of inorganic sulphates.

12. In the process of separating organic sulphate and sulphonate salts from inorganic salts by mixing an aqueous solution of organic salts selected from the group consisting of organic sulphate and sulphonate salts and inorganic salts with an organic solvent wherein the organic salts are soluble to cause the formation of liquid layers including a layer containing a major portion of the organic solvent, and isolating said layer, the improvement which comprises dehydrating the isolated layer containing a major portion of the organic solvent to precipitate inorganic salts therefrom, and removing said precipitated inorganic salts from contact with said organic solvent.

13. In the process of purifying organic sulphate and sulphonate salts by removing inorganic sulphates in admixture therewith which comprises mixing an aqueous solution of organic salts selected from the group consisting of organic sulphate and sulphonate salts and inorganic sulphates with a sufficient amount of an aliphatic alcohol containing at least two carbon atoms to cause the formation of liquid layers, isolating the predominantly alcohol layer, and recovering the organic salts from the alcohol, the improvement comprising partially distilling the isolated alcohol layer to vaporize water therefrom and to precipitate inorganic sulphates dissolved therein, and removing said inorganic sulphates from contact with the alcohol whereby the organic salts can be subsequently recovered from said alcohol.

14. In the process of purifying organic sulphate and sulphonate salts by removing inorganic sulphates in admixture therewith which comprises mixing an aqueous solution of organic salts selected from the group consisting of organic sulphate and sulphonate salts and inorganic sulphates with a sufficient amount of isopropanol to cause the formation of liquid layers, isolating the predominantly isopropanol layer, and recovering the organic salts from the isopropanol, the improvement comprising partially distilling the predominantly isopropanol layer to vaporize water therefrom and to precipitate inorganic sulphates dissolved therein, introducing before completion of the partial distillation additional isopropanol to the predominantly isopropanol layer to compensate for isopropanol vaporized therefrom, and removing said inorganic sulphates from contact with the isopropanol whereby the organic salts can be subsequently recovered from the isopropanol substantially free of inorganic sulphates.

KENNETH LYMAN RUSSELL.